March 30, 1965     J. FAJANS     3,176,247
MASER

Filed April 11, 1961     3 Sheets-Sheet 1

INVENTOR.
JACK FAJANS
BY Hans Beeman
Agent

March 30, 1965 J. FAJANS 3,176,247
MASER
Filed April 11, 1961 3 Sheets-Sheet 2

INVENTOR.
JACK FAJANS
BY Hans Berman
Agent.

March 30, 1965   J. FAJANS   3,176,247
MASER

Filed April 11, 1961   3 Sheets-Sheet 3

INVENTOR.
JACK FAJANS
BY Hans Beerman
Agent

United States Patent Office 3,176,247
Patented Mar. 30, 1965

3,176,247
MASER
Jack Fajans, Douglaston, N.Y., assignor to Electrokinetics Corporation, Florham Park, N.J., a corporation of New York
Filed Apr. 11, 1961, Ser. No. 102,268
11 Claims. (Cl. 332—57)

This invention relates to devices for microwave amplification by stimulated emission of radiation, commonly referred to as masers.

Microwave amplification by a known type of maser relies on the existence of a normal thermal equilibrium between particles of a solid substance at three discrete levels of energy, and the possibility of producing an inverted population of such particles in which the distribution of particles on the several energy levels is shifted from the normal equilibrium distribution toward a higher level. Spontaneous transition of particles from the highest toward the intermediate level releases energy of radiation at a frequency consistent with the energy separating of the two levels, and this transition may be stimulated by radiation at that frequency.

The afore-described type of maser requires a powerful magnetic field and means for maintaining an operating temperature close to absolute zero. It is the primary object of this invention to provide an effective maser which is relatively simple to build and operate. More specifically, I aim to provide a device of the general type described which is operative at or near room temperature, and which does not rely for operativeness on a magnetic field.

I have found that an inverted population of particles may be created in a secondary emitter body of gaseous particles of one mercury isotope by exposing the body to the radiation of an electric arc produced in a primary emitter body of another mercury isotope, and that the secondary radiation emitter may be stimulated by microwaves of appropriate frequency to produce amplified radiation of that frequency.

The exact nature of this invention as well as many of the advantages thereof will be readily apparent from consideration of the following specification related to the annexed drawing in which.

Figure 1:
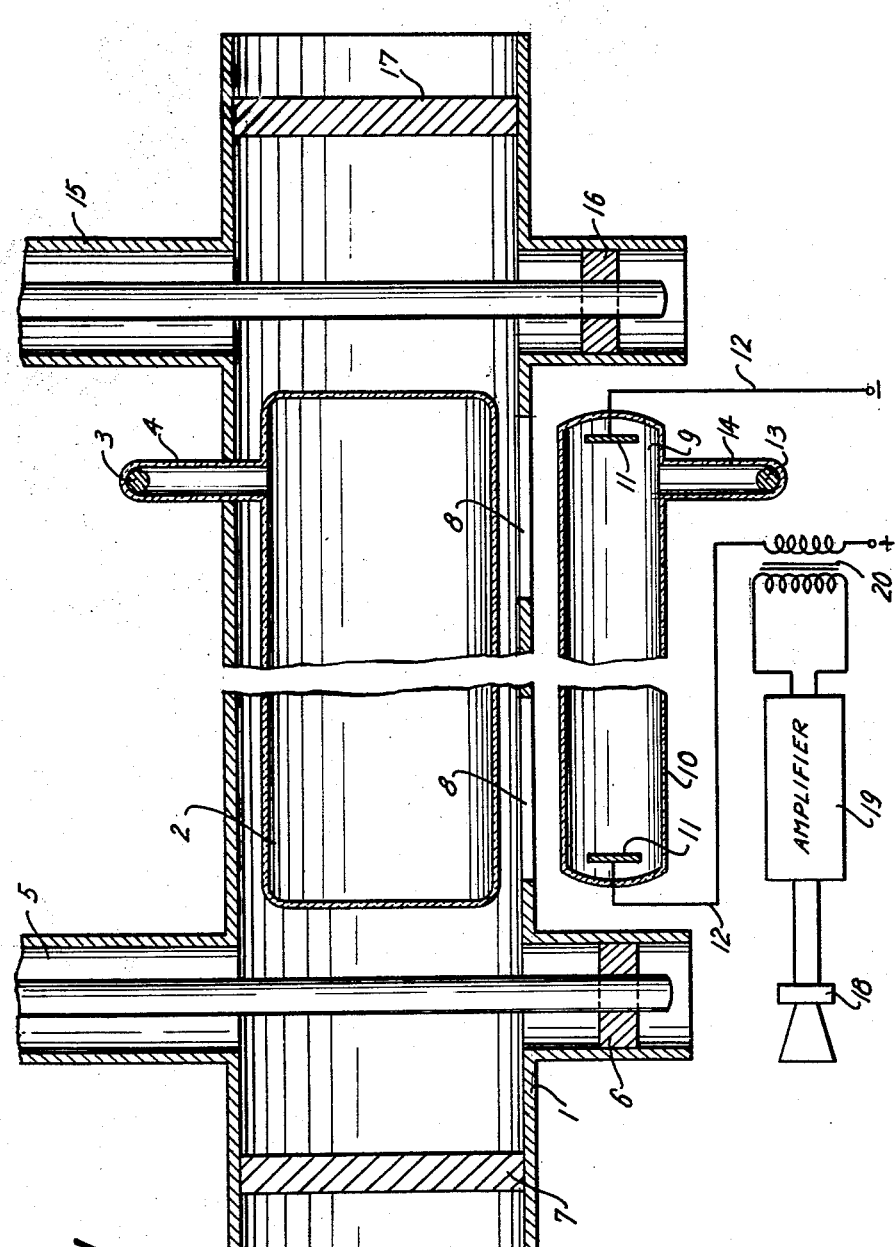
FIG. 1 shows a preferred first embodiment of the invention which constitutes a traveling wave amplifier or oscillator, the view being in longitudinal axial section relative to the direction of wave propagation.

Referring now to the drawing in detail, and initially to FIG. 1, there is shown a cylindrical wave guide 1 of aluminum or silver plated brass arranged for operation in the transverse electric mode ($TE_{1,1}$) at a frequency of 14,060 megacycles per second. The wave guide 1 encloses a vapor cell 2 consisting of a sealed tube of fused quartz filled with mercury vapor consisting essentially of the isotope of atomic weight 201. The vapor is in equilibrium with drops 3 of liquid mercury 201 held in a sealed narrow appendage 4 of the vapor cell 2 extending outside of the wave guide 1. The appendage 4 and the mercury drops 3 in it are maintained at room temperature by the ambient air. The band width of the oscillations developed in the mercury vapor may be expanded by additionally enclosing a gas such as air in the vapor cell 2. A broad range of frequencies may be produced by air at 50 atmospheres pressure.

The wave guide 1 is connected by a coaxial cable 5 to an antenna or other source (not shown) of a signal having a carrier wave frequency of substantially 14,060 megacycles. Coupling of the coaxial cable 5 to the wave guide 1 is assured by plungers 6 and 7 in a manner well known in the art.

The aluminum walls of the wave guide 1 have longitudinal slots 8 which permit passage of radiation from a mercury vapor lamp 9 to the vapor cell 2. Although only one row of slots 8 and a single lamp 9 are shown in the drawing, it will be understood that there are as many slots as are practical, and that they are placed in a known manner so as not to interfere with operation of the wave guide 1 in the $TE_{1,1}$ mode. As many arc lamps 9 as may be arranged adjacent the slots 8 are provided. Since they are identical with the one illustrated, description will be limited to the latter.

The mercury arc lamp 9 consists essentially of a tubular quartz envelope 10 in which two electrodes 11 are longitudinally spaced. Leads 12 from each electrode pass through the quartz wall of the mercury arc lamp for connection to a high voltage source of direct electric current. The quartz envelope 10 is filled with argon at low pressure and with mercury vapor in phase equilibrium with a few drops 13 of mercury isotope 198 contained in a tubular appendage 14 of the envelope 10.

The amplified signal produced in the wave guide 1 is abstracted for utilization by a suitable load such as an antenna through a coaxial cable 15 coupled to the wave guide 1 by plungers 16 and 17.

The output of a microphone 18 is fed to an amplifier 19, and the amplified signal produced by the same modulates the power supply of the mercury vapor lamp 9 by means of a transformer 20 the secondary winding of which is in circuit with one of the leads 12.

The thickness of the aluminum walls of the wave guide 1 is not critical and is approximately two millimeters. The quartz wall of the sealed tube 2 should be as thin as is consistent with the mechanical strength required. A thickness of 0.5 millimeter meets these requirements adequately. The internal radius of the aluminum tube 1 is 7 millimeters, and that of the quartz tube 2 is 6 millimeters. The length of the wave guide 1 is three meters, but its length is not critical. As will be evident to those skilled in the art, the length of the wave guide may be increased to advantage as long as the power gained by the increase in dimensions more than balances the additional losses in the walls and elsewhere.

Figure 6:
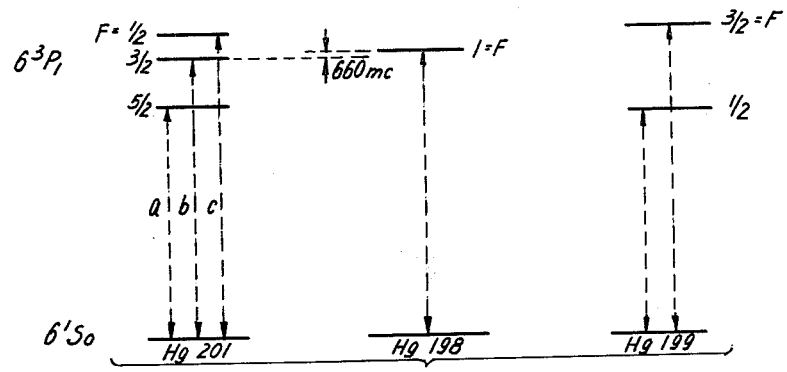
FIG. 6 illustrates the spectroscopic hyperfine levels of the mercury isotopes 201, 199, and 198 which are well suited for use in the maser of the invention.

The afore-described apparatus operates as follows:

Electric potential applied to the electrodes 12 produces an arc in the low pressure vapor of mercury 198 contained in the mercury vapor arc lamp 9. A major portion of the electromagnetic radiation emitted by the excited mercury 198 vapor in the electric arc has a wave length of 2537 Angstrom units (A). As shown diagrammatically in FIG. 6, mercury 201 in the electronic state $6^3P_1$ is capable of existing at several hyperfine excited energy levels which constitute a hyperfine triplet whose center component, for which $F=3/2$, is spaced from the ground state $6^1S_0$ by an electronic transition $b$ almost coinciding with the sole transition of mercury 198 corresponding to a wave length of 2537 A. The difference is only 660 megacycles, a separation much smaller than the overlapping of the transitions due to Doppler broadening.

The symbol F is employed in this specification in a conventional manner. A definition of F may be derived from the fact that the total mechanical moment of an atom (nuclear moment plus electronic moment) is expressed by the term $$\frac{h}{2}\sqrt{F(F+1)}$$

wherein $h$ is Planck's constant.

Irradiation of the mercury 201 vapor in the quartz tube 2 thus raises particles of the vapor from the ground state $6^1S_0$ preferentially to the $F=3/2$ state to the virtual exclusion of the $F=1/2$, and the $F=5/2$ states. An inverted population is created in which a high concentration of particles at $F=3/2$ is maintained. This concentration is many orders of magnitude greater than that of the particles at the lower lying $F=5/2$ state. Transition of particles from the higher to the lower state is accompanied by emission of radiation the frequency of which is 14,060 megacycles per second, the value having been obtained by measurements subject to an experimental error of ±100 megacycles. This transition can be stimulated by a signal having substantially the same frequency, and fed to the wave guide 1 by the cable 5.

The stimulated emission of radiation thus produces amplification of the signal introduced. The amplified signal may be abstracted by the coaxial cable 15.

The radiation of 2537 A. wave length required to maintain an inverted population in the vapor of mercury 201 may be produced otherwise than by an exciting radiation from mercury 198, although this method is preferred because of the plentiful supply of this isotope, and for other reasons which will presently become evident.

The rare isotope mercury 196 emits a narrow spectral line at 2537 A. suitable for exciting the $F=1/2$ state of mercury 201. The resulting transition from the $F=1/2$ state to the $F=3/2$ state generates radiation at a frequency of approximately 7900 megacycles per second. The lack of a ready source of supply for mercury 196 makes such a maser not very attractive at this time. Mercury 201 excited by the radiation of mercury 196 to the state $F=1/2$ also emits radiation at a frequency of substantially 22,000 megacycles during the transition from $F=1/2$ to $F=5/2$. When mercury 198 in the apparatus of FIG. 1 is replaced by mercury 196, the wave guide 1 may be tuned to 7900 or 22,000 megacycles to selectively amplify signals of corresponding frequencies.

The mercury isotope 199 has excited energy levels which constitute a hyperfine doublet of which the $F=3/2$ state is capable of being selectively excited by the 2537 A. radiation of mercury 196 to form an inverted population. Transition from the $F=3/2$ state to the $F=1/2$ state releases radiation at 22,000 megacycles.

In a similar manner, the 2537 A. radiation from an electric arc in vapors of mercury 199 may be employed to produce an inverted population in a mercury 201 vapor in which the $F=1/2$ state predominates.

The apparatus illustrated may also be employed to advantage for converting the energy of a mercury vapor arc at wave lengths different from 2537 A. into amplified microwave energy. Energy emitted by mercury 200 at 1849 A. excites mercury 201 to the level $F=5/2$ in the $6^1P_1$ electronic state. Transition of the mercury 201 from the $F=5/2$ level to the $F=1/2$ level emits radiation at a frequency near 5,000 megacycles.

The naturally occurring mixture of mercury isotopes may be employed in the vapor cell 2 of the apparatus illustrated in FIG. 1, and the same natural mixture may constitute the vapor in the mercury vapor arc lamp 9 if a filter containing vapors of mercury 198 is interposed between the arc lamp and the vapor cell. The secondary radiation induced in the material contained in the cell 2 has a strong line at 7,900 megacycles.

It will be understood that natural mercury enriched with the several isotopes discussed may be employed instead of the pure isotopes at some loss in amplifier gain.

The mercury concentrations in the arc lamp 9 and in the vapor cell 2 must be limited in order to produce the narrow spectral lines necessary for selective excitation of the desired hyperfine states. Broadening of the lines by absorption and self-reversal tends to equalize the populations of the several excited states.

Suitable mercury vapor concentrations are maintained by keeping the mercury drops 3 and 13 in the tubular appendages 4 and 14 at a temperature between −10° C. and +50° C. for masers of the invention operating with an exciting radiation of 2537 A. This temperature range includes all practical room temperatures. For all practical purposes, this maser requires neither cooling nor heating. When operating with an exciting radiation of 1849 A., I maintain a lower mercury concentration in the arc lamp 9 and the vapor cell 2 by maintaining the respective liquid mercury drops 3 and 13 within the temperature range of −40° C. to 0° C. A mixture of common salt and ice in which the appendages 4, 14 are immersed will maintain the desired low equilibrium vapor pressure of mercury in the lamp 9 and the cell 2.

Usual practice should be followed to operate the arc lamp 9 at the lowest possible temperature consistent with the input of electric energy. Any significant Doppler or Stark broadening of the spectral lines of the lamp is to be avoided. Proper operating conditions will prevail as long as the total broadening of the 2537 A. line from the mercury 198 arc lamp does not result in a half breadth of the line greater than one third of the separation of the hyperfine structure components of mercury 201 $F=3/2$ and $F=5/2$ to avoid direct excitation of the $F=5/2$ level.

The apparatus illustrated in FIG. 1 will spontaneously oscillate at 14,060 megacycles when operated at sufficiently high gain, oscillations being started by thermal effects. The wave guide 1 is converted to a resonator by replacing the coaxial cable 5 and the plungers 6 and 7 with a shorting plate as is well known. The carrier frequency of 14,060 megacycles may be modulated at rates up to almost twenty megacycles by modulating the electric current feeding the arc lamp 9 by means of the output signal of the amplifier 19. The band width of the modulated carrier frequency is limited by the lifetime of the excited $6^3P_1$ state of mercury 201. Employment of a traveling wave amplifier connected to the output cable 15 makes possible the amplification of this relatively broad twenty megacycle band.

The relative positions of the wave guide containing a vapor cell and of the mercury arc lamp may be interchanged and otherwise varied in many ways as will become apparent from the following description of modified embodiments of the invention. They also show that an oscillator or amplifier based on this invention may take various resonator configurations. Unless otherwise specifically stated, the modified devices of FIGS. 2 to 7 operate in substantially the same manner as the traveling wave amplifier and oscillator of FIG. 1.

Figure 2:
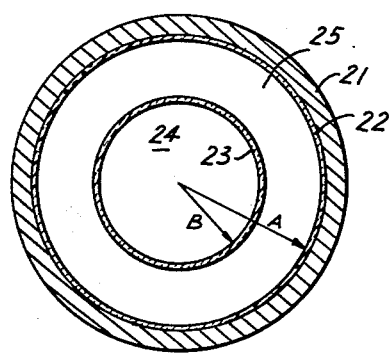
FIG. 2 is a transversely sectional view of a modified traveling wave amplifier of the invention.

FIG. 2 shows a tubular wave guide amplifier essentially consisting of three coaxial tubes and mercury vapor contained therein. An outer aluminum tube 21 closely envelopes a quartz tube 22. The cylindrical space within the tube 22 is divided by the third tube, a quartz tube 23, into a central cylindrical vapor cell 24 and an annular space 25 enclosed within quartz walls and separated from the vapor cell 24 by the quartz tube 23. The vapor cell is filled with vapors of mercury 201. The annular space 25 contains argon at low pressure and a small amount of mercury 199 vapor. Electrodes (not shown) permit an electric arc to be established in the annular space 25.

The outer aluminum tube 21 has an internal radius A and the inner quartz tube 23 has a radius B. The dimensions of the radii depend on the manner in which the wave guide amplifier is to be operated. For the transverse electric mode ($TE_{1,1}$) to be the only one propagated, A should have a length between $\lambda/3.41$ and $\lambda/2.61$ wherein $\lambda$ is the free space wavelength of the radiation to be propagated. The radius B is preferably about ¾ of A.

When the mercury arc in the annular space 25 operates at very high intensity, the wave generated is essentially confined to a cylinder of radius B. In this case, the value of B should be between the limits of $\lambda/3.41$ and $\lambda/2.61$, and A should be of the order of twice B.

It will be understood that the vapor cell 24 and the annular lamp space 25 extend into suitable tubular appendages in which some mercury can be held at ambient temperature to maintain the mercury vapor pressure in the lamp and in the vapor cell at the necessary low value.

Resonator arrangements in which the mercury vapor lamp and the vapor cell are both enclosed within the resonator cavity have the advantage of most efficient utilization of the energy input, but it is usually not possible to maintain a desirably low temperature for any appreciable length of time without provisions for external cooling of the resonator walls. The presence of the mercury vapor lamp in the cavity reduces the space available for the vapor cell. The mercury vapor lamp also causes some attenuation of the emitted radiation. The choice among the several embodiments of the apparatus of the invention disclosed herein, and those additional modifications which will readily suggest themselves to those skilled in the art on the basis of the present teachings will be guided by the requirements of a specific application.

Figure 3:
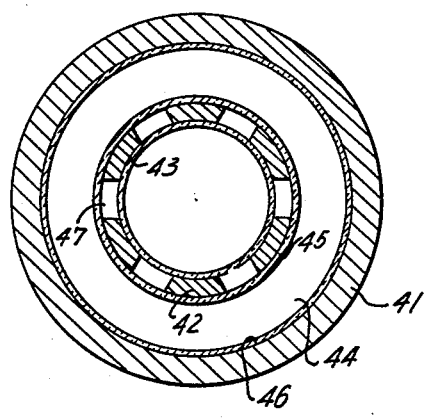
FIG. 3 illustrates an additional embodiment of the invention which constitutes a coaxial wave guide, the view corresponding to that of FIG. 2.

A coaxial wave guide is shown in FIG. 3. It has two coaxial tubular metal walls 41 and 42. The inner metal tube encloses a cylindrical space substantially filled by a quartz-walled cylindrical mercury arc lamp 43. In the annular space 44 between the two metal walls 41, 42 there are two radially spaced concentric quartz walls 45 and 46 which enclose a suitable quantity of mercury 201 vapor. Perforations 47 in the inner metal tube 42 permit radiation from the arc lamp 43 to reach the mercury vapor in the surrounding vapor cell.

Figure 4:
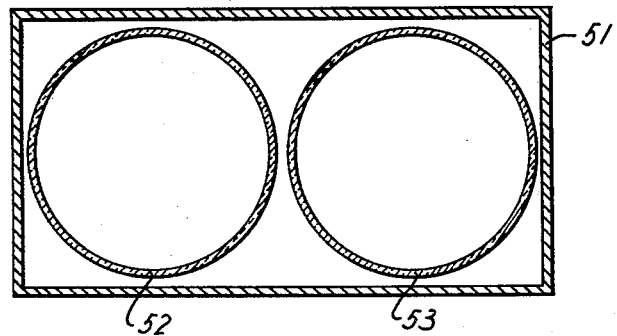
FIG. 4 is a similar view of a rectangular section serving as the wave guide for a maser.

FIG. 4 is a view of a modification of the apparatus of FIG. 1 in which a rectangular wave guide 51 is employed whose width and height respectively correspond to $\lambda/1.05$ and $0.48\lambda$. Two quartz tubes 52, 53 of a diameter conforming to the internal height of the wave guide and arranged side by side respectively serve as the walls of a vapor cell and of a mercury vapor lamp.

The guide 51 is arranged to operate in the $TE_{1,0}$ mode. It will be appreciated that any of the guides illustrated in FIGS. 1 to 5 may be operated in higher modes with employment of mode suppressors. Other forms of cavity resonators may be employed when following the above teachings. Other coupling connections, conventional impedance matching devices, and other auxiliary devices well known in microwave techniques may be used for connecting the resonators with signal sources or with output loads, and other modifications may be made in the means for propagating the microwaves generated or amplified by the maser of the invention as is well known to those skilled in this art.

Figure 5:
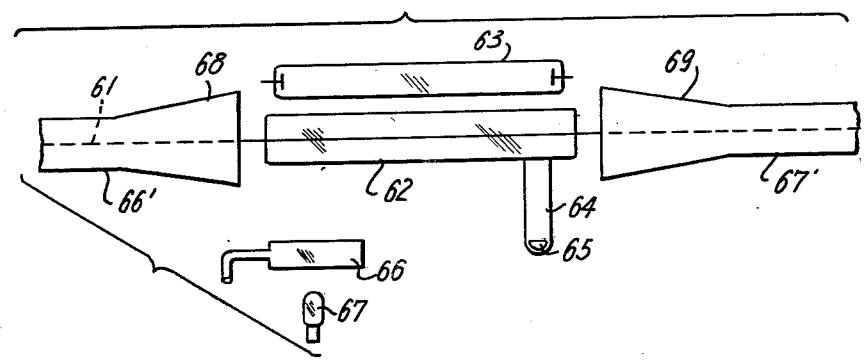
FIG. 5 illustrates a surface wave transmission system embodying a maser according to this invention in side elevation.

Radiation at the amplification or oscillating frequency of the maser of the invention may also be propagated in a surface wave transmission system an example of which is shown in FIG. 5 in longitudinal section.

An aluminum wire 61 of 0.05 centimeter diameter passes axially through a vapor cell 62 similar to the cell 2 described with reference to FIG. 1. The cell has a diameter of 3 centimeters and is filled with vapors of mercury 201. Several mercury vapor arc lamps 63 of which only one is indicated in the drawing are circumferentially arranged about the cell 62 and may also be replaced by a single tubular lamp of annular cross section of the type shown in FIG. 2. The vapor cell 62 and the mercury vapor arc lamp 63 are provided with tubular appendages which are kept at room temperature, only the appendage 64 of the vapor cell 62 being shown in FIG. 5. It contains a small amount 65 of liquid mercury isotope 201. The lamps 63 are filled with vapor of mercury 198.

The wire 61 is the internal conductor of a coaxial cable which also includes an external conductor the two terminal portions 66' and 67' of which adjacent the vapor cell 62 are equipped with horns 68 and 69, each about 9 centimeters long and flaring in a direction toward the cell 62 to an orifice of a diameter of 5 centimeters. The wire 61 illustrated is straight, but it may be replaced by a wire helix as is well known in surface wave transmission systems without altering the basic operation of the device. The wire 61 leads an input signal at 14,060 megacycles per second into the vapor cell 62 and withdraws an amplified signal at the same frequency therefrom.

The length of the vapor cell 62 and of the arc lamps 63 may be increased at will. The vapor cell and the lamps may each consist of a plurality of longitudinal sections butted up against each other end to end. The upper useful limit of amplified length is determined by amplitude losses equal to the power gains to be derived from further longitudinal extension.

Each of the amplifiers illustrated in FIGS. 2 to 5 may be converted to an oscillator in the manner described above with reference to the apparatus shown in FIG. 1. The carrier frequency generated may be modulated by modulating the current passing through the exciting mercury vapor arc. FIG. 5 further illustrates means suitable for demodulating the output signal of a maser oscillator or amplifier of the invention.

As shown in FIG. 5, the vapor cell 62 is not surrounded by the opaque metal walls of a resonant cavity. The quartz envelope of the cell 62 thus transmits radiation of 2537 A. wave length. This radiation consists partly of primary radiation of the mercury vapor lamp 63, and partly of secondary radiation emitted by mercury 201 in the vapor cell 62 at two discrete frequencies corresponding to the level separations $a$ and $b$ shown in FIG. 6. Since the primary radiation of the vapor lamp 63 energizes only transitions to the $F=3/2$ state, the radiation from the vapor cell 62 is substantially free from radiation corresponding to the level separation $c$. Radiation corresponding to the level separation $a$ is precisely commensurate with the radiation of 14,060 megacycles emitted by transition from the $F=3/2$ state to the $F=5/2$ state.

A modulated microwave signal emitted by the vapor cell 62 at a carrier frequency of 14,060 megacycles is thus accompanied by a modulated ultraviolet radiation at a wave length of 2537 A. corresponding to the level separation $a$, and a non-modulated radiation of 2537 A. corresponding to the level separation $b$. I provide an absorption cell 66 in the path of the ultraviolet radiation. The cell has quartz walls and is filled with vapors of mercury 198 at ambient temperature in phase equilibrium with liquid mercury 198. The absorption cell absorbs the 2537 A. radiation corresponding to the level separation $b$ and any unaltered primary radiation present, but permits substantially unimpeded passage of the modulated 2537 A. radiation corresponding to the level separation $a$.

The modulated radiation is received by a photomultiplier tube 67 of type 1P28 sensitive to ultraviolet radiation of 2537 A., and an amplified signal corresponding to the signal fed to the vapor cell 62 by the wire 61 may be derived from the terminals of the photomultiplier tube 67 in a manner well known per se, and not requiring further description.

A demodulated signal may be abstracted in an analogous manner from the masers illustrated in FIGS. 1 to 4. A window transparent to ultraviolet rays is provided in the metallic walls of the wave guides illustrated to permit passage of the ultraviolet radiation to an absorption cell and a photomultiplier tube in the manner shown in FIG. 5.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What I claim is:

1. In a maser, a primary emitter body of gaseous particles of a first isotope of mercury capable of assuming two discrete energy levels; means for supplying energy to said body for energizing transition of particles thereof from the lower one of said levels to the higher level, whereby said body emits electromagnetic radiation of a frequency corresponding to the separation of said levels when said particles spontaneously revert from said higher to said lower level; a secondary emitter body of gaseous particles of a second isotope of mercury capable of assuming three discrete energy levels, the separation of the highest and the lowest of said three levels substantially corresponding to the frequency of said electromagnetic radiation, said secondary emitter body being exposed to said radiation, whereby the latter body emits electromagnetic radiation of three frequencies respectively corresponding to the separations of the three energy levels thereof, a first one of said frequencies being substantially identical with the frequency of the radiation emitted by said primary emitter body; and means for withdrawing radiation at a second one of said three frequencies from said secondary emitter body.

2. In a maser as set forth in claim 1, modulating means for modulating the energy supplied to said primary emitter body.

3. In a maser as set forth in claim 1, means for withdrawing radiation at the third one of said three frequencies from said secondary emitter body.

4. In a maser as set forth in claim 1, two containers having respective portions substantially transparent to said radiation emitted by said primary emitter body, said containers respectively enclosing said primary and said secondary emitter body.

5. In a maser, a primary emitter body of gaseous particles of mercury 198; means for supplying energy to said body for exciting emission of electromagnetic radiation therefrom at a wave length of 2537 Angstrom units; a secondary emitter body of gaseous particles of mercury 201 exposed to said radiation, whereby said secondary emitter body is energized to emit radiation at a frequency of substantially 14,060 megacycles per second; and means for withdrawing the emitted radiation from said second body.

6. In a maser as set forth in claim 5, a source of electromagnetic radiation at a frequency of substantially 14,060 megacycles per second; and means for transmitting the radiation of said source to said secondary emitter body for stimulating emission of radiation from the latter.

7. In a maser, a primary emitter body of gaseous particles of mercury 198; means supplying energy to said body for exciting emission of electromagnetic radiation therefrom at a wave length of 2537 Angstrom units; a secondary emitter body of gaseous particles of mercury 201 exposed to said radiation, whereby said secondary emitter body is energized to the $F=3/2$ state to emit radiation at a frequency of substantially 14,060 megacycles per second by transition to the $F=5/2$ state, and ultraviolet radiation at a wave length of 2537 Angstrom units by transition from said $F=5/2$ state to the ground state; means for withdrawing said radiation at a frequency of substantially 14,060 megacycles per second from said secondary emitter body; and means for withdrawing said ultraviolet radiation from said secondary emitter body.

8. In a maser as set forth in claim 7, means for modulating the energy supplied to said primary emitter body, whereby said radiation at a frequency of substantially 14,060 megacycles and said ultraviolet radiation are modulated.

9. In a maser as set forth in claim 7, means for demodulating said ultraviolet radiation.

10. In a maser, a container defining a cavity resonant to electromagnetic radiation having a frequency of substantially 14,060 megacycles per second; a secondary emitter body of mercury 201 in said cavity; means for transmitting electromagnetic radiation at a wave length of substantially 2537 Angstrom units to said emitter body in said cavity; and means for withdrawing from said cavity electromagnetic radiation having said frequency.

11. In a maser arrangement, an elongated first conductor; a tubular second conductor substantially coaxially spaced from a longitudinal portion of said first conductor; a vapor cell enveloping another longitudinal portion of said first conductor; vapor of mercury 201 in said cell at a concentration corresponding to the equilibrium vapor pressure of said mercury 201 at a temperature between 0 degrees centigrade and +50 degrees centigrade; and a body of mercury 198 emitting radiation at a wave length of 2537 Angstrom units, said vapor of mercury 201 being exposed to said radiation.

References Cited by the Examiner

UNITED STATES PATENTS

| | | | |
|---|---|---|---|
| 2,836,722 | 5/58 | Dicke et al. | 331—94 X |
| 2,843,732 | 7/58 | Johnson et al. | 332—57 X |
| 2,884,524 | 4/59 | Dicke | 331—94 |
| 2,929,922 | 3/60 | Schawlow et al. | 331—94 |

OTHER REFERENCES

Javan: Physical Rev. Letters, Vol. 3, No. 2, pages 86–89, July 15, 1959.

ROY LAKE, *Primary Examiner.*

ROBERT H. ROSE, ALFRED L. BRODY, *Examiners.*